United States Patent [19]

Iwai

[11] 3,878,596

[45] Apr. 22, 1975

[54] WORKPIECE ASSEMBLING APPARATUS

[75] Inventor: Shigeru Iwai, Chiba, Japan

[73] Assignee: Kabushiki Kaisha Daini Seikosha, Tokyo, Japan

[22] Filed: Feb. 6, 1974

[21] Appl. No.: 439,981

[30] Foreign Application Priority Data

Feb. 7, 1973 Japan .............................. 48-15278

[52] U.S. Cl. ............................ 29/211 M; 29/211 G
[51] Int. Cl. ............................................ B23q 7/10
[58] Field of Search ......... 29/211 M, 211 D, 211 R, 29/211 C, 208 R

[56] References Cited

UNITED STATES PATENTS 3,762,018 10/1973 Romney ......................... 29/211 M

*Primary Examiner*—Thomas H. Eager
*Attorney, Agent, or Firm*—Robert E. Burns; Emmanuel J. Lobato; Bruce L. Adams

[57] ABSTRACT

A workpiece assembling apparatus in which a transfer table travels stepwise in a given direction. A plurality of chutes are disposed along a path at points for delivering different components therefrom to a magnetic chuck on an arm of a robot that is mounted on the transfer table. The robot is operated so that the arm picks off individual components from the corresponding chutes at each step. As the transfer table moves to the next step the robot transfers the components to a jig on an assembly station of the transfer table itself for assembly. The components are disposed for assembly in the jig and are finally assembled in fixed relationship by a driver unit on the apparatus at the end of the transfer steps of the transfer table.

2 Claims, 3 Drawing Figures

WORKPIECE ASSEMBLING APPARATUS

BACKGROUND OF THE INVENTION

This invention relates generally to an assembling apparatus and more particularly to an automatic transfer and assembly apparatus in which the operations of assembly take place during the transfer of the apparatus.

Most assembly apparatus have a time cycle in which they do not take advantage of carrying out assembly operations while executing transfer operations.

SUMMARY OF THE INVENTION

It is a principal object of the present invention to provide an assembly apparatus for assembling workpieces during the advancement or transfer thereof from one station to the next.

The workpiece assembling apparatus according to the invention comprises a transfer table operable stepwise in a given direction. A plurality of chutes are disposed spaced from each other adjacent a path followed by the transfer table as it travels stepwise. The chutes hold different components to be assembled together into an assembly. A robot is provided on the transfer table and has a transfer arm provided with a magnetic chuck which is operable to a first position for picking off individual components from the chutes sequentially as the transfer table travels successive steps for placing the transfer arm in alignment with the chutes sequentially. The robot arm is operated to a second position delivering the components to an assembly jig as the transfer table moves from station to station or chute to chute. An assembly station is provided in the transfer table having an assembly jig to which the components are delivered for assembly sequentially. A driver unit assembles the components into an assembly.

BRIEF DESCRIPTION OF THE DRAWINGS

Other objects and advantages will appear from the following description of an example of the invention and the novel features will be particularly pointed out in the appended claims and drawings in which:

DESCRIPTION OF THE PREFERRED EMBODIMENT

Figure 1:
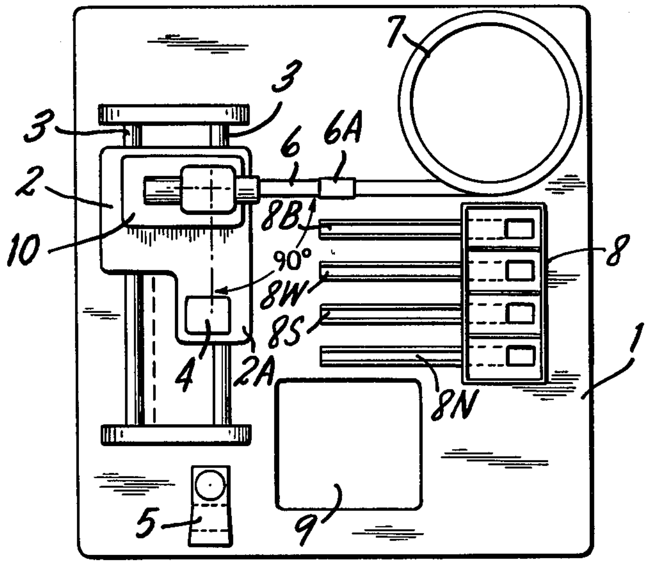
FIG. 1 is a plan view of an assembly apparatus according to the invention.
Figure 2:
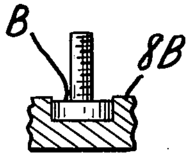
FIG. 2 is a fragmentary vertical section view of one chute and illustrates the components delivered therefrom.
Figure 3:
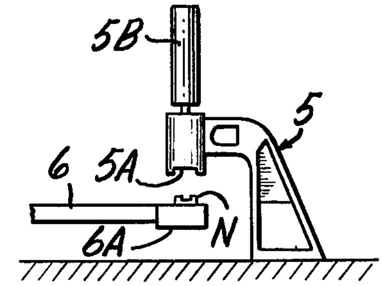
FIG. 3 is a fragmentary vertical section view of a part of the apparatus illustrated in FIG. 1.

FIG. 1 illustrates an apparatus according to the invention comprising a support 1 having a transfer table 2 that travels stepwise on elongated guides 3. The transfer table 2 is operated in known manner, for example pneumatically or hydraulically or electrically by a sequence control apparatus or by conventional numerical control techniques. The transfer table transports an assembly station having an assembly jig 4 mounted on an upwardly projecting portion 2A of the table 2. A driver unit 5 is mounted on the base support 1 adjacent the terminal position of the transfer stations of the table as illustrated.

The transfer table has a robot 10 of conventional construction that has a transfer arm 6 with a magnetic chuck 6A. The robot is provided with a spiral clipping chute 7.

A hopper chute 8 has four delivery chutes 8B, 8W, 8S, 8N which are disposed in parallel relationship and are respectively supplied with bolts, washers, spring seats and nuts, and disposed in that order for alignment with the front and rear movement of the chuck 6A provided on the arm A as it travels from one station to the next.

As the table is advanced stepwise the arm 6 moves to the first chute 8B and the magnetic chuck picks a bolt by attraction therefrom. During transfer to the next station or chute the bolt is delivered to the jig 4. The arm carries out the movement from the position illustrated to one at 90° to the path of the transfer table to the transfer jig sequentially and is in position for carrying out picking off of the individual components from the chutes as the transfer table moves into position for the arm to align with the chutes sequentially. In this way the bolts are loosely assembled with washers and spring seats and nuts on the jig.

The arm 6 removes the nuts from the chute 8N and as the transfer table transfers to the next step the nuts are delivered to an overhanging driver unit 5 comprising a cylindrical box 5A and a motor 5B. The robot moves the arm 6 upwardly the nuts are attached at the end thereof are delivered to the chuck 5A of the driver unit. After delivery the arm moves downwardly while the chuck 5A is turned by the motor 5B to fasten the nuts N so that the entire assembly of components is assembled in fixed relationship.

After assembly the assembled workpieces are grasped by the arm 6 and are delivered into a box 9.

It will be understood that the present invention contributes greatly to reducing cost as compared with the conventional apparatus of this type which need a plurality of units corresponding to the number of workpieces. Because the assembling operation of a plurality of workpieces is carried out by one unit, a three-dimensional industrial robot and the transfer arm with magnetic chuck, and a plurality of chutes the apparatus is greatly simplified.

What I claim and desire to secure by letters patent is:

1. Workpiece assembling apparatus comprising, a transfer table operable stepwise in a given direction, a plurality of chutes disposed spaced from each other adjacent a path followed by said transfer table as it travels stepwise, said chutes holding different components to be assembled together into an assembly, a robot on said transfer table having a transfer arm provided with a magnetic chuck and operable to a first position for picking off individual components from said chutes sequentially as said transfer table travels successive steps for placing said transfer arm in alignment with said chutes sequentially and operable to a second position delivering the components sequentially to as assembly jig, an assembly station on said transfer table having an assembly jig receiving the components sequentially for assembly thereof, and a driver unit assembling said components into an assembly.

2. Workpiece assembling apparatus according to claim 1, in which said chutes are disposed to deliver the components therein at different spaced points disposed along a path parallel to the path of travel of said transfer table.

* * * * *